US011852604B2

United States Patent
Chen et al.

(10) Patent No.: US 11,852,604 B2
(45) Date of Patent: Dec. 26, 2023

(54) SYSTEMS AND METHODS FOR REDUCTION OF OXYGEN TENSION IN ELECTROCHEMICAL BIOSENSORS

(71) Applicant: Polymer Technology Systems, Inc., Whitestown, IN (US)

(72) Inventors: Jie Chen, Whitestown, IN (US); Christopher Dailey, Whitestown, IN (US); Gary L. Hughes, Camby, IN (US)

(73) Assignee: Polymer Technology System, Inc., Whitestown, IN (US)

( * ) Notice: Subject to any disclaimer, the term of this patent is extended or adjusted under 35 U.S.C. 154(b) by 200 days.

(21) Appl. No.: 16/913,704

(22) Filed: Jun. 26, 2020

(65) Prior Publication Data

US 2020/0408710 A1 Dec. 31, 2020

Related U.S. Application Data (60) Provisional application No. 62/867,130, filed on Jun. 26, 2019.

(51) Int. Cl.
 *G01N 27/327* (2006.01)
(52) U.S. Cl.
 CPC ..... *G01N 27/3272* (2013.01); *G01N 27/3273* (2013.01); *G01N 27/3274* (2013.01)
(58) Field of Classification Search
 None
 See application file for complete search history.

(56) References Cited

U.S. PATENT DOCUMENTS

| | | |
|---|---|---|
| 2007/0272564 A1 | 11/2007 | Huang |
| 2012/0208226 A1 | 8/2012 | Ikebukuro et al. |
| 2012/0296189 A1 | 11/2012 | Bhogal et al. |

FOREIGN PATENT DOCUMENTS

WO  WO 2019/238751 A1  12/2019

OTHER PUBLICATIONS

International Search Report and Written Opinion dated Sep. 24, 2020 issued in co-pending PCT App. No. PCT/US2020/039894 (10 pages).
Stephen M. Jones, et al. "Electron Transfer and Reaction Mechanism of Laccases", Cell Mol Life Sci. Mar. 2015, 72(5): 869-883.
Supplementary European Search Report dated Jun. 6, 2023 issued in European patent application No. 20832842. (11 pages).
Monteiro Tiago et al: "Construction of effective disposable biosensors for point of care testing of nitrite", Talanta, vol. 142, Apr. 27, 2015 (Apr. 27, 2015), pp. 246-251, XP093031025, NL ISSN: 0039-9140, DOI: 10.1016/j.talanta.2015.04.057.

(Continued)

*Primary Examiner* — J. Christopher Ball
(74) *Attorney, Agent, or Firm* — Haynes and Boone, LLP (57) ABSTRACT

In one embodiment, a system for detecting an analyte in a bodily fluid sample includes an electrochemical biosensor, the electrochemical biosensor configured to receive the bodily fluid sample, test for the analyte, and produce an analyte level for the analyte. The system further includes a mediator, the mediator configured to provide for the testing of the analyte by facilitating electron exchange between the analyte and the biosensor. The system further includes an oxygen tension reducing agent, the oxygen tension reducing agent reducing interference of oxygen with the operation of the mediator.

4 Claims, 6 Drawing Sheets

(56) References Cited

OTHER PUBLICATIONS

Portaccio Met al: "Laccase biosensor based on screen-printed electrode modified with thionine-carbon black nanocomposite, for Bisphenol A detection", Electrochimica ACTA, Elsevier, Amsterdam, NL, vol. 109, Jul. 31, 2013 (Jul. 31, 2013), pp. 340-347; XP028754459, ISSN: 0013-4686, DOI: 10.1016/J.ELECTACTA. 2013.07.129.

Saithip Pakapongpan et al: "Electrochemical sensors for hemoglobin and myoglobin detection based on methylene blue-multiwalled carbon nanotubes nanohybrid-modified glassy carbon electrode", Electrochimica ACTA, Elsevier, Amsterdam, NL, vol. 56, No. 19, May 23, 2011 (May 23, 2011), pp. 6831-6836, XP028239560, ISSN: 0013-4686, DOI: 10.1016/J.ELECTACTA.2011.05.089 [retrieved on May 31, 2011].

SYSTEMS AND METHODS FOR REDUCTION OF OXYGEN TENSION IN ELECTROCHEMICAL BIOSENSORS

CROSS REFERENCE

This application claims the benefit of U.S. provisional application No. 62/867,130, filed Jun. 26, 2019, the entirety of which is hereby incorporated by reference.

BACKGROUND

Diagnostic testing devices find usage in many scenarios, including home use, use by a doctor's office, and usage at health fairs. Diagnostic testing devices typically perform testing for various analytes in a bodily fluid and yield results that are equivalent to laboratory testing. Although the devices are designed to be easy to use and reliable, the users of such devices commonly do not follow specific laboratory procedures, have extensive precision and accuracy double checks, and have control procedures. Additionally, many times with electrochemical test strips there are interference compounds in the sample that may provide for an erroneous result. One such compound is oxygen. Blood of course, quickly absorbs oxygen when exposed to air and therefore many blood samples will contain oxygen.

BRIEF SUMMARY

In one embodiment, a system for detecting an analyte in a bodily fluid sample includes an electrochemical biosensor, the electrochemical biosensor configured to receive the bodily fluid sample, test for the analyte, and produce an analyte level for the analyte. The system further includes a mediator, the mediator configured to provide for the testing of the analyte by facilitating electron exchange between the analyte and the biosensor. The system further includes an oxygen tension reducing agent, the oxygen tension reducing agent reducing interference of oxygen with the operation of the mediator. In one alternative, the mediator is ferrocyanide. In another alternative, the oxygen tension reducing agent is laccase. Alternatively, the laccase reacts with the oxygen to produce water. In another alternative, the analyte is hemoglobin. Alternatively, the oxygen tension reducing agent is a platinum electrode. In one alternative, the system further includes a meter, the meter receiving the electrochemical signal Alternatively, the meter is configured to active the platinum electrode at an oxygen reducing voltage, which causes the platinum electrode to reduce oxygen interference, and then activated at a detection voltage, for the detection of the analyte. In another alternative, the mediator is ferrocyanide, the oxygen tension reducing agent is laccase, the laccase reacts with the oxygen to produce water, and the analyte is hemoglobin. Alternatively, the ferrocyanide is coated on an electrode of the electrochemical sensor.

In one embodiment, an electrochemical biosensor for detecting an analyte in a bodily fluid sample, the electrochemical biosensor configured to receive the bodily fluid sample, test for the analyte, and produce an analyte level for the analyte includes, a mediator, the mediator configured to provide for the testing of the analyte by facilitating electron exchange between the analyte and the biosensor. The biosensor further includes an oxygen tension reducing agent, the oxygen tension reducing agent reducing interference of oxygen with the operation of the mediator. The biosensor further includes two electrodes, the two electrodes activatable by a meter to test for the analyte. Alternatively, the mediator is ferrocyanide the oxygen tension reducing agent is laccase, the laccase reacts with the oxygen to produce water, and the analyte is hemoglobin. In one alternative, the oxygen tension reducing agent is a platinum electrode and the platinum electrode is one of the two electrodes. In another alternative, the platinum electrode is activatable at an oxygen reducing voltage, which causes the platinum electrode to reduce oxygen interference, and then activated at a detection voltage, for the detection of the analyte. Alternatively, the ferrocyanide ferrocyanide is coated on an electrode of the electrochemical sensor.

In one embodiment, a method of testing for an analyte, with reduced interference of oxygen, includes providing a system. The system includes an electrochemical biosensor, the electrochemical biosensor configured to receive the bodily fluid sample, test for the analyte, and produce an analyte level for the analyte. The system further includes a mediator, the mediator configured to provide for the testing of the analyte by facilitating electron exchange between the analyte and the biosensor. The system further includes, an oxygen tension reducing agent, the oxygen tension reducing agent reducing interference of oxygen with the operation of the mediator. The system further includes a meter for receiving the electrochemical biosensor. The method further includes dosing the electrochemical biosensor with a sample containing the analyte. The method further includes detecting an electrical property of the sample with the meter and electrochemical biosensor and calculating an analyte level of the analyte with the meter. In one alternative, the method further includes reducing the interference of oxygen with the oxygen tension reducing agent and the oxygen reducing reagent is laccase. Alternatively, laccase converts oxygen to water to provide for reducing. In another alternative, the mediator is ferrocyanide and the analyte is hemoglobin. In one alternative, the method further includes reducing the interference of oxygen with the oxygen tension reducing agent, and the oxygen reducing reagent is a platinum electrode for the electrochemical biosensor. Alternatively, the reducing includes activating the platinum electrode at oxygen reducing voltage, which causes the platinum electrode to reduce oxygen interference, and then activating the platinum electrode at a detection voltage.

DETAILED DESCRIPTION

Certain terminology is used herein for convenience only and is not to be taken as a limitation on the embodiments of the systems and methods for Reduction of Oxygen Tension in Electrochemical Biosensors. In many embodiments, these systems and methods include the use of multi-copper oxidases. In many embodiments, the systems and methods include the use of an electrochemical biosensor. Generally, these electrochemical biosensors or test strips have at least two electrodes. They have a well where the sample interacts with the electrodes. They may have a sample port, capillary channel, or many other features that provide for the sample to reach the well where it can interact with the electrodes. The electrodes in are usually attached to leads that then may interact with a meter. The meter may provide voltage or amperage to the electrodes. Alternatively, it may not. The meter may measure an electrical characteristic of the sample, including but not limited, amperage, voltage (voltage difference), resistance, and capacitance. From this, using analysis and equations, the level of the analyte of interest may be measured by the meter and displayed to the user. Generally, either the electrodes (one or both) or the well has a reagent in it to facilitate the measure of an electrical characteristic. Alternatively, a channel or other area in the test element may have a reagent. In some alternatives, the reagent may be added via a premix step. In many embodiments, the reagent is plated, attached, or deposited to one of the electrodes. In such a configuration, the reagent may be oxidized by oxygen in the sample. This may reduce the effectiveness of the reagent or generate a false signal. Therefore, in many embodiments, a multicopper enzyme is used to limit this oxidation. In many embodiments, platinum electrodes are used to limit this oxidation. In many embodiments, a test strip is used and the test strip measures for hemoglobin using ferrocyanide as a mediator. In some embodiments, Hb A1c is tested for by the test strip. In many alternatives, many different analytes may be tested for, including but not limited to, glucose, lipids (HDL, LDL, triglycerides), creatinine, etc.

Electrochemical biosensors using oxidase or reductase as biorecognition elements or based on cathodic processes are often subject to oxygen tension in the sample. Oxygen reduction directly on electrode surface or catalyzed by the sensing enzyme of the biosensors at the potential applied for analyte detection frequently lead to erroneous analyte quantification. Therefore, how to eliminate oxygen interference from various blood types (arterial, capillary and venous) or from different sample handling procedure is a challenge in designing electrochemical point of care devices. Several methods may be possible to solve oxygen tension in the electrochemical biosensors, such as using chemical oxygen scavengers (such as sodium sulfite, ascorbic acid), careful selection of mediators with redox potential close to enzyme redox potential, or by protein engineering techniques. For example, most chemical oxygen scavengers are electrochemically active. Therefore, how to control the amount of chemical scavenger to achieve removal of oxygen interference while not affecting analyte analysis is very challenging. Glucose oxidase-catalase-glucose oxygen removal systems may remove oxygen interference for nitrate sensing using nitrate reductase. In this case, oxygen is reduced to hydrogen peroxide by oxidation of glucose catalyzed by glucose oxidase. Then the produced hydrogen peroxide is converted into water and oxygen by the catalase. This technique has may be an effective way to remove oxygen interference, but the requirement of adding large amount of glucose and the gluconic acid production in the enzymatic reaction causing continuous pH drop prohibited broader application in designing point of care bio-electrochemical devices. Instead, in many embodiments of the systems and methods disclosed herein, very mild but effective oxygen consuming agents including multi-copper oxidases like laccase, bilirubin oxidase and/or different electrode materials like platinum were evaluated, due to their capability for direct oxygen reduction to water. Therefore, no requirement for additional substrates for the enzymatic oxygen removal system are needed, eliminating the potential side effects on the electrochemical sensing performance.

The influence of oxygen tension in blood samples on electrochemical device performance was eliminated by introducing multi-copper oxidase enzymes and/or by proper selecting electrode materials. To eliminate the influence of oxygen tension from various blood types (arterial, capillary and venous) or introduced by various sample handling procedures in the electrochemical POC (point of care) sensor performance the systems and method herein were developed. In many embodiments, a hemoglobin assay with ferrocyanide strips was evaluated using venous blood or oxygenated blood, with or without introduction of oxygen reduction reagents such as multi-copper oxidase enzymes. Oxygenated blood was manually prepared by introducing oxygen into the same venous blood by continuous rocking in a container with large space gap for around 15 mins. Result showed that significant difference in sensor performance was observed between venous blood and oxygenated blood when no oxygen reduction reagents were introduced. When oxygen reduction reagents were introduced into oxygenated blood, such difference was eliminated. Additionally, the proper selection of electrode materials like using platinum electrode also contributed to inhibition of oxygen tension.

Electrochemical biosensors using oxidase or reductase as biorecognition elements or based on cathodic processes are frequently subject to oxygen tension in the sample. Oxygen may be reduced directly on electrode surface or be catalyzed by the sensing enzyme or mediators of the biosensors at the potential applied for analyte detection, resulting in background signal change or erroneous analyte quantification. Therefore, how to eliminate the oxygen interference from various blood types (arterial, capillary and venous) or from different sample handling procedure is a challenge in designing electrochemical point of care devices.

So far, several methods have been proposed and applied to mitigate oxygen tension the electrochemical biosensors, such as using chemical oxygen scavengers (like sodium sulfite, ascorbic acid), proper selection of mediators with redox potential close to enzyme redox potential, or by protein engineering techniques. Take chemical oxygen scavengers for example, most chemical oxygen scavengers like sodium sulfites or ascorbic acid are electrochemically active. Therefore, how to control the chemical scavenger amount to remove oxygen interference while not affecting the analysis in the electrochemical biosensors is very tricky. Efforts have been made to find an effective way to take care of the oxygen tension in the electrochemical devices, while not affecting sensor performance. Glucose oxidase-catalase-glucose oxygen removal system may be explored to remove oxygen interference for nitrate sensing using nitrate reductase. In this case, oxygen is reduced to hydrogen peroxide by oxidation of glucose catalyzed by glucose oxidase. Then the produced hydrogen peroxide is converted by catalase into water and oxygen. This technique has been proven an effective way to eliminate oxygen interference, but the requirement of adding large amount of glucose and the gluconic acid production as a result of the enzymatic reaction causes continuous pH drop, which prohibits its broader application in designing point of care bio-electrochemical devices.

In embodiments of the systems and methods herein, mild, eco-friendly and effective oxygen consuming agents like multi-copper oxidases were evaluated, due to their capability for direct oxygen reduction to water. Laccase is an example of multi-copper enzyme that can catalyze the oxidation of a wide range of compounds, while using molecular oxygen as the electron acceptor. The reaction is achieved by an internal electron transfer via the T1 center to the trinuclear T2/T3 cluster, producing water as the only by-product. Thus, the side-effect of by-products on the sensor performance as shown in the glucose oxidase-catalase-glucose oxygen removal systems is eliminated in the current system.

Figure 1:
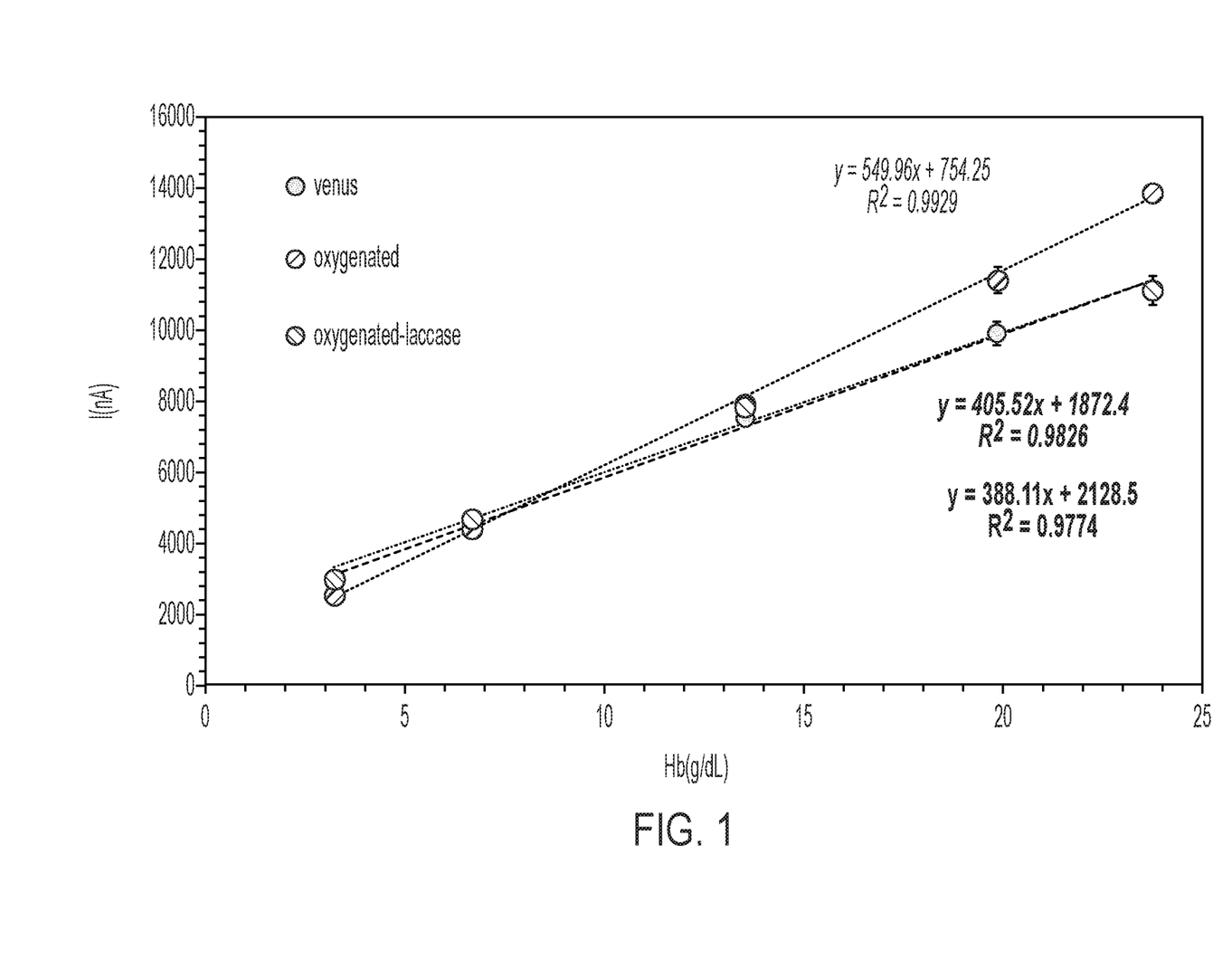
FIG. 1 shows the performance of one embodiment of a hemoglobin sensor using venous and oxygenated blood with and without laccase.

A reduction hemoglobin assay was used as a model system to test the effect of oxygen tension on the sensor performance without and with laccase. FIG. 1 shows the sensor response with venous and oxygenated blood without and with laccase. The oxygenated blood was prepared by inversing venous blood in vials with large air gap for around 20 mins to ensure all the hemoglobin were oxygenated. From FIG. 1, the hemoglobin biosensors showed different response to venous and oxygenated blood. FIG. 1 shows hemoglobin sensor performance using venous and oxygenated blood with and without laccase. The strips used were ferrocyanide strips on gold strips. The strips were coated in a pH 6.5 buffer solution with polymers like PEO (Polyethylene glycol) or PVA (Polyvinyl alcohol) and non-ionic surfactants. E=−525 mV. The blood was lysed and treated with a pH 7.5 buffered mixture solution and surfactant lysing agent triton X-100, hemoglobin relaxing agent: imidazole, cationic surfactant TTAB (Tetradecyltrimethylammonium Bromide), and a biocide component (1,2-Benzisothiazolinone). The ratio of the blood and buffered mixture solution was 1 to 5. The Higher slope was observed with oxygenated blood because of the reduction of ferrocyanide from the oxidation reaction between interfering oxygen and ferrocyanide at the negative potential of −545 m V on the electrode surface, leading to erroneously increased sensor response. With the introduction of laccase into oxygenated blood/buffered mixture solution, sensor response to the oxygenated blood were the same as venous blood. The addition of laccase reduced the response slope of hemoglobin sensor to oxygenated blood from 549.96 to 388.1, indicating that laccase was able to remove the oxygen tension from the oxygenated blood sample.

Figure 2A:
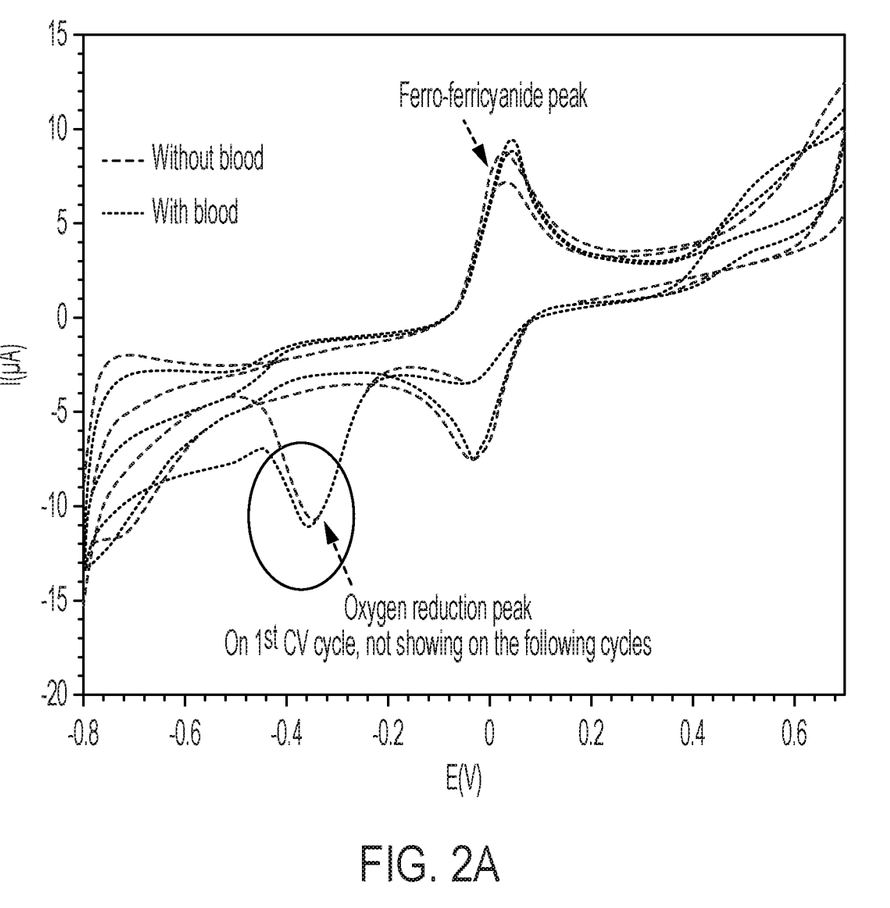
FIG. 2A shows current/voltage curves of a hemoglobin assay with ferrocyanide coated platinum strips in blood sample and in buffer solution.
Figure 2B:
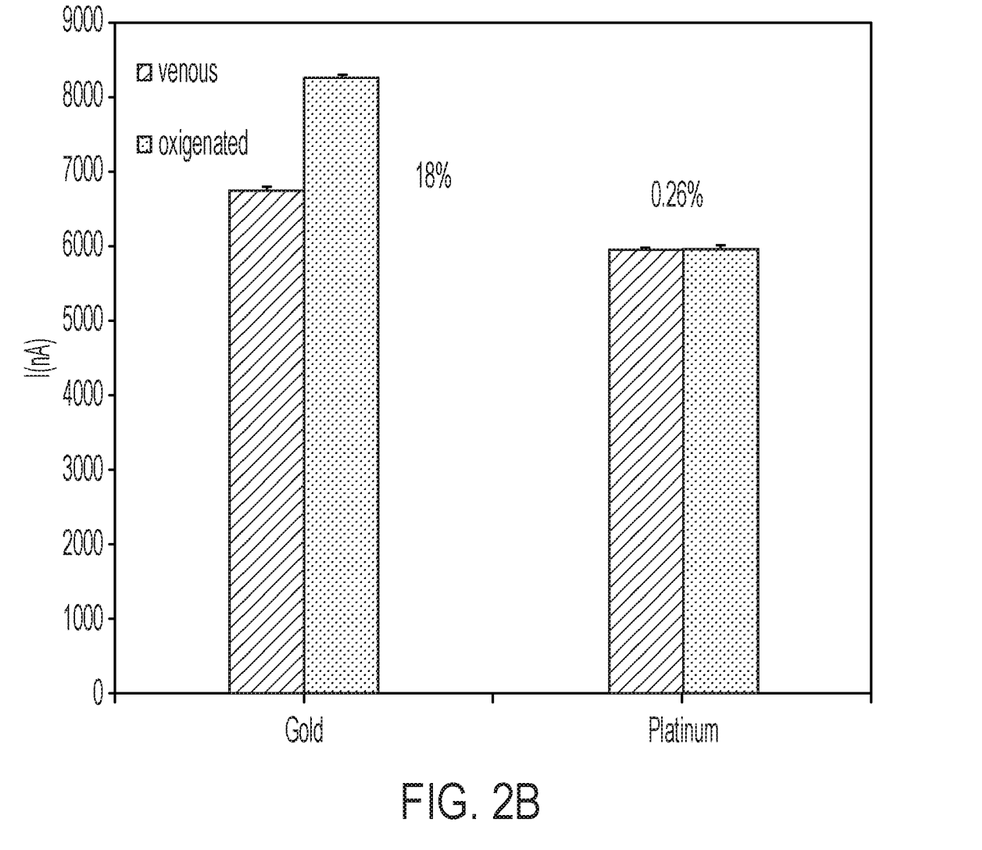
FIG. 2B shows hemoglobin assay response to venous and oxygenated blood on gold strips at −545 m V or on platinum strips with two potential method.
Figure 2C:
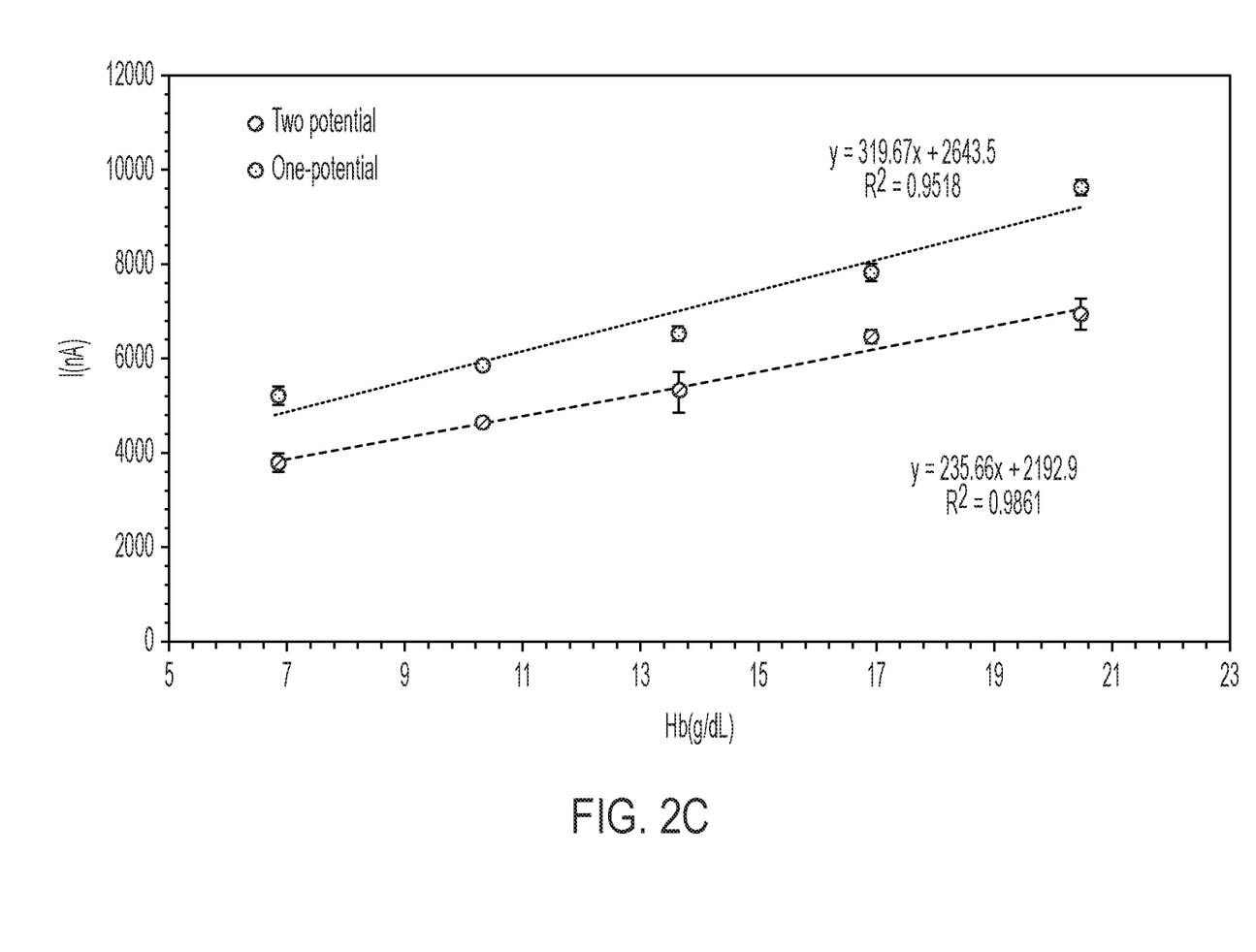
FIG. 2C shows a calibration curve of hemoglobin assay on platinum strips with one (only a single voltage is applied) and two potential methods (two voltages are applied, one to reduce the oxygen and the other to test for the analyte)

The effect of different electrode substrate materials (gold vs. platinum) on the oxygen interference was also evaluated. The results shown above were on gold strips. Without introduction of oxygen removal reagent laccase, there was significant difference in sensor performance for venous an oxygenated blood. Herein, it was evaluated whether changing the strip substrate materials from gold to platinum would eliminate the oxygen tension on sensor performance due to its effective catalyzing ability to oxygen reduction. The CV curves of hemoglobin assay with ferrocyanide coated platinum strips in blood sample and in buffer solution were shown in FIG. 2A. For both buffer solutions without and with blood samples, there was a reduction peak observed in the potential around −0.4V on the first cathodic scan, which likely resulted from the interference reduction reaction of dissolved oxygen occurring on platinum electrode surface. The reduction peak at the potential of −0.4V was only present in the first cathodic cycle, but not the following cycles. Since the oxygen reduction peak potential was higher than the hemoglobin detection potential (−545 m V), we designed a two-potential method to take the advantage of platinum oxygen reduction ability at the potential of −400 m V for a certain amount of time (oxygen reducing voltage) to remove oxygen tension first, then applied the relatively low potential (−545 m V) to detect hemoglobin (detection voltage). The hemoglobin assay response to venous and oxygenated blood on platinum strips at −545 m V or with two potential method are shown in FIG. 2B. On platinum strip with one potential reduction test at −545 m V, oxygenated blood exhibited significantly higher response (18%) than venous blood. With the two-potential treatment of oxygenated blood, there are no statistically significant difference between venous blood and oxygenated blood. The calibration curve of hemoglobin assay on platinum strips with one and two potential methods was shown in FIG. 2(C). Compared with single potential method, the two-potential method decreased the slope from 319.67 to 235.66, due to the removal of oxygen interference from the solution. Besides, a linear dose response was still observed on the platinum strips with two potential method. From these results, for electrochemical assays based on cathodic reduction reaction, platinum is a good candidate electrode material due to its oxygen reducing ability to remove oxygen interference, while not affecting sensor performance. FIG. 2A shows a capacitance vs. voltage curve of hemoglobin assay with ferrocyanide coated platinum strips in blood sample and in buffer solution; Scanning rate: 50 mv/s. FIG. 2B shows a capacitance vs. voltage curve of sensor response on platinum strips at −545 m V and on platinum strips with two potential test technique (−400 mV for certain amount of times, then measure hemoglobin at −545 mV). FIG. 2C shows calibration curves of hemoglobin assay using single potential technique and two potential test techniques on platinum strips.

Figure 3:
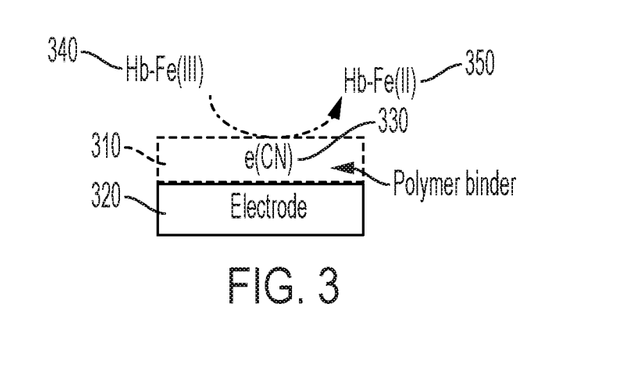
FIG. 3 shows a diagram of one embodiment of an electrode system including an electrode and ferrocyanide.

In many embodiments, the sensor system consists of a working electrode, a counter electrode and a fill detecting electrode. FIG. 3 shows a diagram of such an electrode system. The electrodes 320 could be made of gold, platinum or carbon material. A spacer was laid over the electrodes to define a fluid channel, and a lid material is placed on top of the spacers to confine the fluid volume, allow fluid dosing and flowing into the channel with a vent hole.

The sensors were coated 310 with ferrocyanide as the mediator in strip reagent solution, which consists of binding polymers 330 like: PEO (polyethylene oxide), PVA (Polyvinylacetate) or hydroxypropyl methylcellulose, surfactant: Triton X-100 in buffer systems with different pH, e.g. MES (2-(N-morpholino) ethanesulfonic acid). In operate, Hb-Fe (III) 340 is converted (reduced) to Hb-Fe(II) 350.

In many embodiments, the sensors were coated with 100 mM ferrocyanide in strip reagent solution. The strip reagents consist of binding polymers like PEO (polyethylene oxide), PVA (Polyvinyl acetate) or hydroxypropyl methylcellulose, surfactant: Triton X-100 in MES buffer with pH of 6.5. The pH of the strip reagent and buffer system could be varied based on experiment needs.

The whole blood was lysed in the lysing solution at the pH of 7.5 with the volume ratio of 1:5. The lysing solution consists of lysing agent like Triton X-100 in the concentration of 0.75%, hemoglobin stabilizer-preferably imidazole at 880 mM, 10 mM NaCl, 3 mM CaCl2, and cationic surfactants like TTAB or Zwittergent and Germicide like 1,2-benzoisothiazol-3-one at the concentration of 8.1 mM. The blood sample was kept at physiological temperature of 37° C. for a few minutes (preferably 3-5 minutes), then dosed onto ferrocyanide coated strips, and the current output at the potential of −525 mV is measured. In order to eliminate the oxygen interference on sensor performance, multi-copper oxidase enzyme (preferably laccase) was directly added into the lysing solution, which was proven to effectively eliminate oxygen interference, producing similar responses between oxygenated blood and venous blood.

Figure 4:
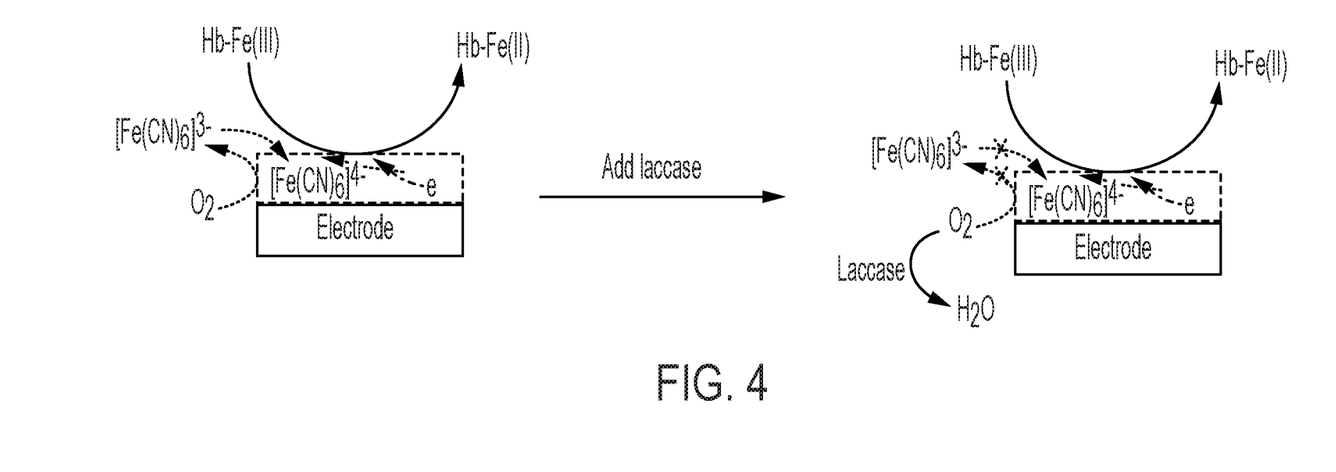
FIG. 4 shows one theorized reaction scheme for the interaction of Laccase in embodiments of the systems described herein.

FIG. 4 shows one theorized reaction scheme for the interaction of Laccase in the system. Multi-copper enzyme like laccase was able to catalyze the four-electron reduction of oxygen to water. In the scheme on the left of FIG. 4, the oxygen interferes with ferrocyanide by oxidizing it. In the reaction scheme on the right, since the Laccase has converted the oxygen to water, the xed out reaction schemes involving oxygen do not occur to oxidize the ferrocyanide. Therefore, with the addition of laccase in the lysing solution, the sensor performance difference between venous blood and oxygenated blood was eliminated due to the catalyzing ability of oxygen to water by laccase. Besides, platinum electrode was proven to effectively eliminate oxygen interference due to its ability to reduce oxygen at negative potential.

Figure 5:
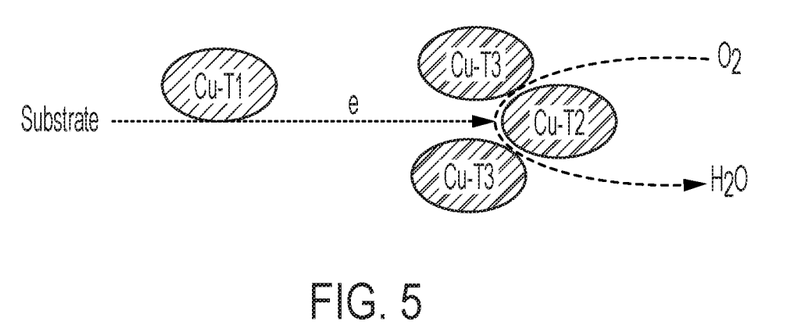
FIG. 5 shows a theoretical diagram of the multi-copper oxidase transfer of electrons from T1 center to T2/T3 center.

FIG. 5 shows a theoretical diagram of the multi-copper oxidase transfer of electrons from T1 center to T2/T3 center. Multicopper oxidases are proteins that have four copper containing prosthetic groups: Type 1 (T1), type 2 (T2), binuclear type 3 (T3), where the T2 and T3 sites form a trinuclear copper cluster. Oxygen binds onto the trinuclear center of multicopper oxidase and is reduced to water, using the electrons internally transferred from the substrate via type I copper. Multicopper oxidases are proteins with have four copper atom prosthetic groups. They can catalyze the oxidation of a wide range of compounds using molecular oxygen as the electron acceptor.

Both Platinum and gold are common electrode materials, but platinum can catalyze oxygen reduction. Currently, platinum is the most practical catalyst for oxygen reduction reaction in fuel cells. In this study, in order to eliminate the oxygen interference which would lead to false signal, we took the advantage of the excellent oxygen reducing ability of platinum electrode to remove oxygen interference at low potential using the two-potential method, while not triggering the hemoglobin reducing reaction at the electrode surface.

There is great potential to apply this the systems and method provided herein into other systems, since the multicopper enzyme works as an oxygen scavenger directly reacting with oxygen to eliminate oxygen interference. The enzyme is preferred to be added into buffer systems but could be immobilized onto electrode surface. To give an example of application to other systems, conventional glucose sensors use glucose oxidase as the sensing enzyme, which is vulnerable to the oxygen level in different sample types. Adding multicopper enzyme (e.g. laccase) into coating reagents will very likely help reduce the oxygen tension from samples.

For the platinum system, is it practical to apply the two-potential method in the reduction reaction-based sensor systems with mediator redox potential lower than oxygen reduction potential. Therefore, the oxygen interference could be diminished during the low potential treatment step, while not affecting the detection reaction in the second step.

In many embodiments, parts of the system are provided in devices including microprocessors. Various embodiments of the systems and methods described herein may be implemented fully or partially in software and/or firmware. This software and/or firmware may take the form of instructions contained in or on a non-transitory computer-readable storage medium. Those instructions then may be read and executed by one or more processors to enable performance of the operations described herein. The instructions may be in any suitable form such as, but not limited to, source code, compiled code, interpreted code, executable code, static code, dynamic code, and the like. Such a computer-readable medium may include any tangible non-transitory medium for storing information in a form readable by one or more computers such as, but not limited to, read only memory (ROM); random access memory (RAM); magnetic disk storage media; optical storage media; a flash memory, etc.

Embodiments of the systems and methods described herein may be implemented in a variety of systems including, but not limited to, smartphones, tablets, laptops, and combinations of computing devices and cloud computing resources. For instance, portions of the operations may occur in one device, and other operations may occur at a remote location, such as a remote server or servers. For instance, the collection of the data may occur at a smartphone, and the data analysis may occur at a server or in a cloud computing resource. Any single computing device or combination of computing devices may execute the methods described.

In various instances, parts of the method may be implemented in modules, subroutines, or other computing structures. In many embodiments, the method and software embodying the method may be recorded on a fixed tangible medium.

While specific embodiments have been described in detail in the foregoing detailed description, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

What is claimed as new and desired to be protected by Letters Patent of the United States is:

1. A method of testing for an analyte, with reduced interference of oxygen, the method comprising:
    providing a system including:
        an electrochemical biosensor, the electrochemical biosensor configured to receive a bodily fluid sample, test for the analyte, and produce an analyte level for the analyte;
        a mediator, the mediator configured to provide for the testing of the analyte by facilitating electron exchange between the analyte and the biosensor, wherein the mediator is ferrocyanide and the analyte is hemoglobin;
        an oxygen tension reducing agent;
        a meter for receiving the electrochemical biosensor;
    dosing the electrochemical biosensor with a sample containing the analyte;
    reducing the interference of oxygen with the operation of the mediator with the oxygen tension reducing agent;
    detecting an electrical property of the sample with the meter and electrochemical biosensor; and,
    calculating an analyte level of the analyte with the meter, wherein the oxygen tension reducing agent is laccase.

2. The method of claim 1, further comprising reducing the interference of oxygen with the oxygen tension reducing agent, wherein the oxygen reducing reagent is laccase.

3. A method of testing for an analyte, with reduced interference of oxygen, the method comprising:
   providing a system including:
      an electrochemical biosensor, the electrochemical biosensor configured to receive a bodily fluid sample, test for the analyte, and produce an analyte level for the analyte;
      a mediator, the mediator configured to provide for the testing of the analyte by facilitating electron exchange between the analyte and the biosensor, wherein the mediator is ferrocyanide and the analyte is hemoglobin;
      an oxygen tension reducing agent;
      a meter for receiving the electrochemical biosensor;
   dosing the electrochemical biosensor with a sample containing the analyte;
   reducing the interference of oxygen with the operation of the mediator with the oxygen tension reducing agent;
   detecting an electrical property of the sample with the meter and electrochemical biosensor; and,
   calculating an analyte level of the analyte with the meter, wherein the oxygen tension reducing agent is a platinum electrode.

4. The method of claim 3, wherein the reducing includes activating the platinum electrode at oxygen reducing voltage, which causes the platinum electrode to reduce oxygen interference, and then activating the platinum electrode at a detection voltage.

* * * * *